Patented Aug. 9, 1938

2,126,477

UNITED STATES PATENT OFFICE 2,126,477

AZO DYESTUFFS AND A PROCESS OF PRODUCING SAME

Hans Krzikalla and Walter Limbacher, Ludwigshafen-on-the-Rhine, Germany, assignors to General Aniline Works, Inc., New York, N. Y., a corporation of Delaware No Drawing. Application October 22, 1937, Serial No. 170,383. In Germany November 6, 1936

5 Claims. (Cl. 260—96)

The present invention relates to azo dyestuffs and a process of producing same.

We have found that new and valuable azo dyestuffs are obtained by coupling diazo compounds of methoxynitroaminobenzene sulphonic acids with 4-nitro-1,3-diaminobenzene.

The azo dyestuffs thus obtained are distinguished by great strength and good levelling power. They dye wool and silk vivid yellow shades of good fastness properties. Due to their good solubility and their fastness and stability to acids and alkalies, the new dyestuffs are especially suitable for dyeing leather. They penetrate deeply into the leather, and the dyeings obtained show a very good fastness to polishing. The dyestuffs, therefore, are especially suitable for dyeing velour-leather.

Compared with the known azo dyestuffs from diazotized substituted aminobenzene sulphonic acids and 4-nitro-1,3-aminobenzene, the new dyestuffs are distinguished by their better solubility in water and their better fastness to light.

The following example will further illustrate how this invention may be carried out in practice, but the invention is not restricted to this example.

Example

A diazo solution prepared from 24.8 parts of 2-methoxy-5-nitro-1-amino-benzene-4-sulphonic acid is allowed to flow into a hydrochloric acid solution of 16.8 parts of 4-nitro-1,3-diaminobenzene, the coupling being carried to completion by the addition of sodium acetate. The dyestuff is precipitated by the addition of sodium chloride and then filtered off by suction and dried. It dyes wool yellow shades.

Similar dyestuffs are obtained by using 2-methoxy-4-nitro-1-aminobenzene-5- or -6-sulphonic acid instead of the abovementioned diazo component.

The dyeing of leather with the dyestuffs described above is suitably carried out in the following manner.

Deacidified chrome-tanned leather is drummed for 20 to 30 minutes at 60° to 65° C. with about 1 to 3 per cent of one of the above described azo dyestuffs in a bath of the ratio 1:4. Then about 2 per cent of sulphonated neat's-foot oil are added and the drumming is continued for further 30 minutes. The leather thus obtained is dyed brown yellow shades which have penetrated deeply into both sides of the leather. Instead of chrome-tanned leather, other types of leather may be used, for example chrome-tanned calf-velour-leather.

What we claim is:

1. A process for the production of azo dyestuffs which consists in coupling diazotized methoxynitroaminobenzene sulphonic acids with 4-nitro-1,3-diaminobenzene.

2. Azo dyestuffs of the general formula

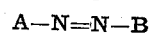

wherein A stands for the radical of a methoxy nitrobenzene sulphonic acid, and wherein B stands for the radical of 4-nitro-1,3-diaminobenzene.

3. The azo dyestuff of the formula

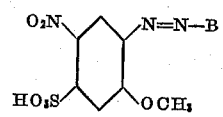

wherein B stands for the radical of 4-nitro-1,3-diaminobenzene.

4. The azo dyestuff of the formula

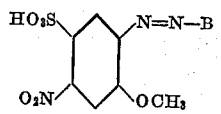

wherein B stands for the radical of 4-nitro-1,3-diaminobenzene.

5. The azo dyestuff of the formula

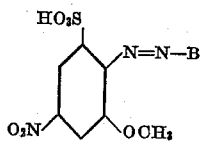

wherein B stands for the radical of 4-nitro-1,3-diaminobenzene.

HANS KRZIKALLA.
WALTER LIMBACHER.